US007643418B1

(12) United States Patent
Varier et al.

(10) Patent No.: US 7,643,418 B1
(45) Date of Patent: Jan. 5, 2010

(54) AGGREGATE RATE CONTROL USING PID

(75) Inventors: Roopesh R. Varier, Sunnyvale, CA (US); Michael J. Quinn, Campbell, CA (US); Jon Eric Okholm, Monte Sereno, CA (US)

(73) Assignee: Packeteer, Inc., Cupertino, CA (US)

( * ) Notice: Subject to any disclaimer, the term of this patent is extended or adjusted under 35 U.S.C. 154(b) by 596 days.

(21) Appl. No.: 11/388,495

(22) Filed: Mar. 24, 2006

(51) Int. Cl.
*H04J 3/14* (2006.01)

(52) U.S. Cl. ....................... 370/232; 370/229; 370/233; 370/234

(58) Field of Classification Search ................. 370/229, 370/230, 230.1, 232, 233, 234, 235, 235.1, 370/236, 236.2, 237, 238, 252, 254, 253, 370/395.21, 395.2, 395.65; 709/223, 224, 709/225, 226, 227, 228, 229, 230, 231, 232, 709/233, 234, 235, 236, 237
See application file for complete search history.

(56) References Cited

U.S. PATENT DOCUMENTS 4,633,672 A 1/1987 Persem et al.
6,333,917 B1 * 12/2001 Lyon et al. .................. 370/236
6,437,889 B2 * 8/2002 Davidson ..................... 398/98
6,476,510 B2 * 11/2002 Soucy ...................... 290/40 C
2003/0028267 A1 * 2/2003 Hales et al. ................... 700/46
2003/0177154 A1 * 9/2003 Vrancic ...................... 708/160
2004/0046448 A1 * 3/2004 Brown ........................ 303/152
2004/0120252 A1 * 6/2004 Bowen et al. ............... 370/229
2005/0086365 A1 * 4/2005 Urro .......................... 709/237
2006/0013132 A1 * 1/2006 Garnett et al. ............. 370/229
2006/0187831 A1 * 8/2006 Justen ........................ 370/229
2006/0209693 A1 * 9/2006 Davari et al. ................ 370/232
2006/0254987 A1 * 11/2006 Burns et al. ................. 210/746
2007/0121511 A1 * 5/2007 Morandin .................. 370/235
2007/0189164 A1 * 8/2007 Smith et al. ................. 370/230
2007/0206674 A1 * 9/2007 Ziauddin et al. ....... 375/240.05
2007/0276279 A1 * 11/2007 Echauz et al. ............... 600/544

OTHER PUBLICATIONS

Agrawal et al., Integrated ARM/AQM Mechanisms based on PID Controllers, IEEE 2005, pp. 6-10.*
PID Controller, Wikipedia, the free encyclopedia, http://en.wikipedia.org/wiki/Proportional-Integral-Derivative_controller, Mar. 22, 2006.

* cited by examiner

*Primary Examiner*—Aung S Moe
*Assistant Examiner*—Abdullah Riyami
(74) *Attorney, Agent, or Firm*—Baker Botts L.L.P.

(57) ABSTRACT

A method for use in a network device that uses a proportional/integral/derivative (PID)-type algorithm to compute one or more flow control parameters intended to achieve a target rate for a data flow.

1 Claim, 10 Drawing Sheets

348

PID INPUT (350)

P - D + I = PID TERM (352)

ΔVIRTUAL CONTROL(VC) RATE = PID TERM * (CURRENT TARGET RATE - RUNNING RATE) (354)

ΔWINDOW SIZE = ΔVC RATE * RTT (356)

WINDOW $SIZE_{FLOW}$= ($WS_{global}$ / # of flows) + ΔWINDOW SIZE (358)

AGGREGATE RATE CONTROL USING PID

CROSS-REFERENCE TO RELATED APPLICATIONS

This application makes reference to the following commonly owned U.S. patent applications, which are herein incorporated in their entirety for all purposes:

U.S. patent application Ser. No. 08/762,828 now U.S. Pat. No. 5,802,106 in the name of Robert L. Packer, entitled "Method for Rapid Data Rate Detection in a Packet Communication Environment Without Data Rate Supervision;"

U.S. patent application Ser. No. 08/970,693 now U.S. Pat. No. 6,018,516, in the name of Robert L. Packer, entitled "Method for Minimizing Unneeded Retransmission of Packets in a Packet Communication Environment Supporting a Plurality of Data Link Rates;"

U.S. patent application Ser. No. 08/742,994 now U.S. Pat. No. 6,038,216, in the name of Robert L. Packer, entitled "Method for Explicit Data Rate Control in a Packet Communication Environment without Data Rate Supervision;"

U.S. patent application Ser. No. 09/977,642 now U.S. Pat. No. 6,046,980, in the name of Robert L. Packer, entitled "System for Managing Flow Bandwidth Utilization at Network, Transport and Application Layers in Store and Forward Network;"

U.S. patent application Ser. No. 09/106,924 now U.S. Pat. No. 6,115,357, in the name of Robert L. Packer and Brett D. Galloway, entitled "Method for Pacing Data Flow in a Packet-based Network;"

U.S. patent application Ser. No. 09/046,776 now U.S. Pat. No. 6,205,120, in the name of Robert L. Packer and Guy Riddle, entitled "Method for Transparently Determining and Setting an Optimal Minimum Required TCP Window Size;"

U.S. patent application Ser. No. 09/479,356 now U.S. Pat. No. 6,285,658, in the name of Robert L. Packer, entitled "System for Managing Flow Bandwidth Utilization at Network, Transport and Application Layers in Store and Forward Network;"

U.S. patent application Ser. No. 09/198,090 now U.S. Pat. No. 6,412,000, in the name of Guy Riddle and Robert L. Packer, entitled "Method for Automatically Classifying Traffic in a Packet Communications Network;"

U.S. patent application Ser. No. 09/198,051, in the name of Guy Riddle, entitled "Method for Automatically Determining a Traffic Policy in a Packet Communications Network;"

U.S. patent application Ser. No. 09/206,772, now U.S. Pat. No. 6,456,360, in the name of Robert L. Packer, Brett D. Galloway and Ted Thi, entitled "Method for Data Rate Control for Heterogeneous or Peer Internetworking;"

U.S. patent application Ser. No. 09/710,442, in the name of Todd Krautkremer and Guy Riddle, entitled "Application Service Level Mediation and Method of Using the Same;"

U.S. patent application Ser. No. 09/966,538, in the name of Guy Riddle, entitled "Dynamic Partitioning of Network Resources;"

U.S. patent application Ser. No. 10/015,826 in the name of Guy Riddle, entitled "Dynamic Tunnel Probing in a Communications Network;"

U.S. patent application Ser. No. 10/039,992, in the name of Michael J. Quinn and Mary L. Laier, entitled "Method and Apparatus for Fast Lookup of Related Classification Entities in a Tree-Ordered Classification Hierarchy;"

U.S. patent application Ser. No. 10/108,085, in the name of Wei-Lung Lai, ion Eric Okholm, and Michael J. Quinn, entitled "Output Scheduling Data Structure Facilitating Hierarchical Network Resource Allocation Scheme;"

U.S. patent application Ser. No. 10/178,617, in the name of Robert E. Purvy, entitled "Methods, Apparatuses and Systems Facilitating Analysis of Network Device Performance;"

U.S. patent application Ser. No. 10/155,936 now U.S. Pat. No. 6,591,299, in the name of Guy Riddle, Robert L. Packer, and Mark Hill, entitled "Method For Automatically Classifying Traffic With Enhanced Hierarchy In A Packet Communications Network;"

U.S. patent application Ser. No. 10/236,149, in the name of Brett Galloway and George Powers, entitled "Classification Data Structure enabling Multi-Dimensional Network Traffic Classification and Control Schemes;"

U.S. patent application Ser. No. 10/334,467, in the name of Mark Hill, entitled "Methods, Apparatuses and Systems Facilitating Analysis of the Performance of Network Traffic Classification Configurations;"

U.S. patent application Ser. No. 10/453,345, in the name of Scott Hankins, Michael R. Morford, and Michael J. Quinn, entitled "Flow-Based Packet Capture;"

U.S. patent application Ser. No. 10/676,383 in the name of Guy Riddle, entitled "Enhanced Flow Data Records Including Traffic Type Data;"

U.S. patent application Ser. No. 10/720,329, in the name of Weng-Chin Yung, Mark Hill and Anne Cesa Klein, entitled "Heuristic Behavior Pattern Matching of Data Flows in Enhanced Network Traffic Classification;"

U.S. patent application Ser. No. 10/812,198 in the name of Michael Robert Morford and Robert E. Purvy, entitled "Adaptive, Application-Aware Selection of Differentiated Network Services;"

U.S. patent application Ser. No. 10/843,185 in the name of Guy Riddle, Curtis Vance Bradford and Maddie Cheng, entitled "Packet Load Shedding;"

U.S. patent application Ser. No. 10/938,435 in the name of Guy Riddle, entitled "Classification and Management of Network Traffic Based on Attributes Orthogonal to Explicit Packet Attributes;" and U.S. patent application Ser. No. 11/027,744 in the name of Mark Urban, entitled "Adaptive Correlation of Service Level Agreement and Network Application Performance."

BACKGROUND

Enterprises have become increasingly dependent on computer network infrastructures to provide services and accomplish mission-critical tasks. Indeed, the performance, security, and efficiency of these network infrastructures have become critical as enterprises increase their reliance on distributed computing environments and wide area computer networks. To that end, a variety of network devices have been created to provide data gathering, reporting, and/or operational functions, such as firewalls, gateways, packet capture devices, bandwidth management devices, application traffic monitoring devices, and the like. For example, the TCP/IP protocol suite, which is widely implemented throughout the world-wide data communications network environment called the Internet and many wide and local area networks, omits any explicit supervisory function over the rate of data transport over the various devices that comprise the network. While there are certain perceived advantages, this characteristic has the consequence of juxtaposing very high-speed packets and very low-speed packets in potential conflict and produces certain inefficiencies. Certain loading conditions degrade performance of networked applications and can even cause instabilities which could lead to overloads that could stop data transfer temporarily.

To facilitate monitoring, management and control of network environments, a variety of network devices, applications, technologies and services have been developed. For example, certain data flow rate control mechanisms have been developed to provide a means to control and optimize efficiency of data transfer as well as allocate available bandwidth among a variety of business enterprise functionalities. For example, U.S. Pat. No. 6,038,216 discloses a method for explicit data rate control in a packet-based network environment without data rate supervision. Data rate control directly moderates the rate of data transmission from a sending host, resulting in just-in-time data transmission to control inbound traffic and buffering of packets, and reduce the inefficiencies associated with dropped packets. Bandwidth management devices also allow for explicit data rate control for flows associated with a particular traffic classification. For example, U.S. Pat. No. 6,412,000, above, discloses automatic classification of network traffic for use in connection with bandwidth allocation mechanisms. U.S. Pat. No. 6,046,980 discloses systems and methods allowing for application layer control of bandwidth utilization in packet-based computer networks. For example, bandwidth management devices allow network administrators to specify policies operative to control and/or prioritize the bandwidth allocated to individual data flows according to traffic classifications. In addition, certain bandwidth management devices, as well as certain routers, allow network administrators to specify aggregate bandwidth utilization controls to divide available bandwidth into partitions. With some network devices, these partitions can be configured to provide a minimum bandwidth guarantee, and/or cap bandwidth, as to a particular class of traffic. An administrator specifies a traffic class (such as FTP data, or data flows involving a specific user or network application) and the size of the reserved virtual link—i.e., minimum guaranteed bandwidth and/or maximum bandwidth. Such partitions can be applied on a per-application basis (protecting and/or capping bandwidth for all traffic associated with an application) or a per-user basis (controlling, prioritizing, protecting and/or capping bandwidth for a particular user). In addition, certain bandwidth management devices allow administrators to define a partition hierarchy by configuring one or more partitions dividing the access link and further dividing the parent partitions into one or more child partitions. U.S. patent application Ser. No. 10/108,085 discloses data structures and methods for implementing a partition hierarchy.

Certain application traffic management devices, such as the PacketShaper® application traffic management device, offered by Packeteer®, Inc. of Cupertino, Calif., support the concurrent use of aggregate bandwidth policies (e.g., partitions), and per-flow bandwidth policies, such as rate policies enforced by the TCP Rate control technologies disclosed in U.S. Pat. No. 6,038,216. A partition is essentially a bandwidth allocation and queuing mechanism. That is, after a packet processor classifies each packet and pushes each packet onto a partition queue associated with the appropriate partition, another process, typically, loops through the partition queues to pop packets off the queues and populate an output queue. Aggregate bandwidth allocation among the different partitions essentially establishes a preference by which a flow control mechanism arbitrates among the corresponding partition queues. For example, a flow control module, while arbitrating among the partition queues, may read more packets from partitions having a higher allocation of bandwidth relative to partitions that have lower allocations. For example, as disclosed in U.S. application Ser. No. 10/108,085, incorporated by reference above, the bandwidth allocated to a given partition affects the rate at which the partition is selected by an output scheduling process and therefore the length of time packets are buffered in the corresponding partition queue. In addition, TCP Rate Control technologies can be used to effect per-flow rate policies to control or influence the rate at which packets are received at a network device and, therefore, use of inbound network bandwidth and the amount of data that is queued at any given time.

The Transmission Control Protocol (TCP) provides connection-oriented services for the protocol suite's application layer—that is, the client and the server must establish a connection to exchange data. TCP transmits data in segments encased in IP datagrams, along with checksums, used to detect data corruption, and sequence numbers to ensure an ordered byte stream. TCP is considered to be a reliable transport mechanism because it requires the receiving host to acknowledge not only the receipt of data but also its completeness and sequence. If the sending host does not receive notification from the receiving host within an expected time frame, the sending host times out and retransmits the segment.

TCP uses a sliding window flow-control mechanism to control the throughput over wide-area networks. As the receiving host acknowledges initial receipt of data, it advertises how much data it can handle, called its window size. The sending host can transmit multiple packets, up to the advertised window size, before it stops and waits for an acknowledgment. The sending host transmits data packets up to the advertised window size, waits for acknowledgement of the data packets, and transmits additional data packets.

TCP's congestion-avoidance mechanisms attempt to alleviate the problem of abundant packets filling up router queues. TCP's slow-start algorithm attempts to take full advantage of network capacity. TCP increases a connection's transmission rate using the slow-start algorithm until it senses a problem and then it backs off. It interprets dropped packets and/or timeouts as signs of congestion. The goal of TCP is for individual connections to burst on demand to use all available bandwidth, while at the same time reacting conservatively to inferred problems in order to alleviate congestion. Specifically, while TCP flow control is typically handled by the receiving host, the slow-start algorithm uses a congestion window, which is a flow-control mechanism managed by the sending host. With TCP slow-start, when a connection opens, only one packet is sent until an ACK is received. For each received ACK, the sending host doubles the transmission size, within bounds of the window size advertised by the receiving host. Note that this algorithm introduces an exponential growth rate. The TCP transmitter increases a connection's transmission rate using the slow-start algorithm until it senses a problem and then it backs off. It interprets dropped packets and/or timeouts as signs of congestion. Once TCP infers congestion, it decreases bandwidth allocation rates.

To increase efficiency and to facilitate allocations of bandwidth to individual flows, it is sometimes desirable to use the TCP rate control technologies disclosed in U.S. Pat. No. 6,038,216 to increase the running rate of a data flow in a manner that would not occur if the TCP slow start mechanism were allowed to run without modification. One way to more quickly grow the flow is to increase the TCP window size advertised to the TCP transmitter in ACK packets. However, computing and re-computing an advertised window size to control data flow rates relative to a target rate (which may also change) in open network environments can be quite challenging. While partitions and per-flow rate policies are generally effective for their intended purposes, they are generally not robust enough for quickly ramping a new flow, for example, to a given target rate without significant undershoot or overshoot. Additionally, if established flows wander from their target running rate, it is desirable to move those flows to the target running rate as soon as possible and also without overshoot or undershoot. Similarly, current methods and systems are also generally not robust enough to efficiently guide a flow back to its assigned target running rate.

In view of the foregoing, it may be beneficial to provide methods, apparatuses and systems to quickly ramp new flows to their target running rate and to quickly guide those flows back to their target running rate, in case the flows wander, both without under or overshoot.

The foregoing examples of the related art and limitations related therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated.

An embodiment by way of non-limiting example provides for a method for use in a network device that has a flow control module operative to allocate network bandwidth to one or more data flows. The method is directed to a bandwidth rate control and includes monitoring a running rate of a data flow between a first and a second host relative to a target rate and computing one or more flow control parameters for the data flow based on the target rate, running rate and a proportional/integral/derivative(PID)-type algorithm. At least one of the one or more flow control parameters is then provided to at least one of the first and second hosts.

Another embodiment by way of non-limiting example provides for a flow control module operative to allocate network bandwidth to one or more data flows. The flow control module includes a network interface, a memory and a processor. Also included is an application, physically stored in the memory, that has instructions operable to cause the processor to monitor a running rate of a data flow between a first and a second host relative to a target rate and compute one or more flow control parameters for the data flow based on the target rate, running rate and a proportional/integral/derivative-type algorithm. The instructions are also operable to cause the processor and the flow control module to provide at least one of the one or more flow control parameters to at least one of the first and second hosts.

Yet another embodiment by way of non-limiting example provides for a method for use in a network device that has a flow control module operative to allocate network bandwidth to one or more data flows. The method is directed to a bandwidth rate control and includes monitoring a running rate of a data flow between a first and a second host relative to a target rate and computing an advertised window size for the data flow based on the target rate, running rate and a proportional/integral/derivative-type algorithm. Computing the advertised window size includes determining a PID term from terms of the proportional/integral/derivative-type algorithm wherein the terms include a proportional term, an integral term and a derivative term. A delta virtual control rate is then determined by multiplying the PID term with a difference between the target rate and the observed running rate for the data flow. After that, a delta window size is determined by multiplying the delta virtual control rate by a round trip time determined for the connection. In turn, the advertised window size is determined by dividing a sum of the global window size corresponding to a partition and the delta window size by a total number of data flows in the partition. Finally, the advertised window size is provided to at least one of the first and second hosts.

In addition to the exemplary aspects and embodiments described above, further aspects and embodiments will become apparent by reference to the drawings and by study of the following descriptions.

BRIEF DESCRIPTION OF THE DRAWINGS

Exemplary embodiments are illustrated in referenced figures of the drawings. It is intended that the embodiments and figures disclosed herein are to be considered illustrative rather than limiting.

DETAILED DESCRIPTION

Figure 1:
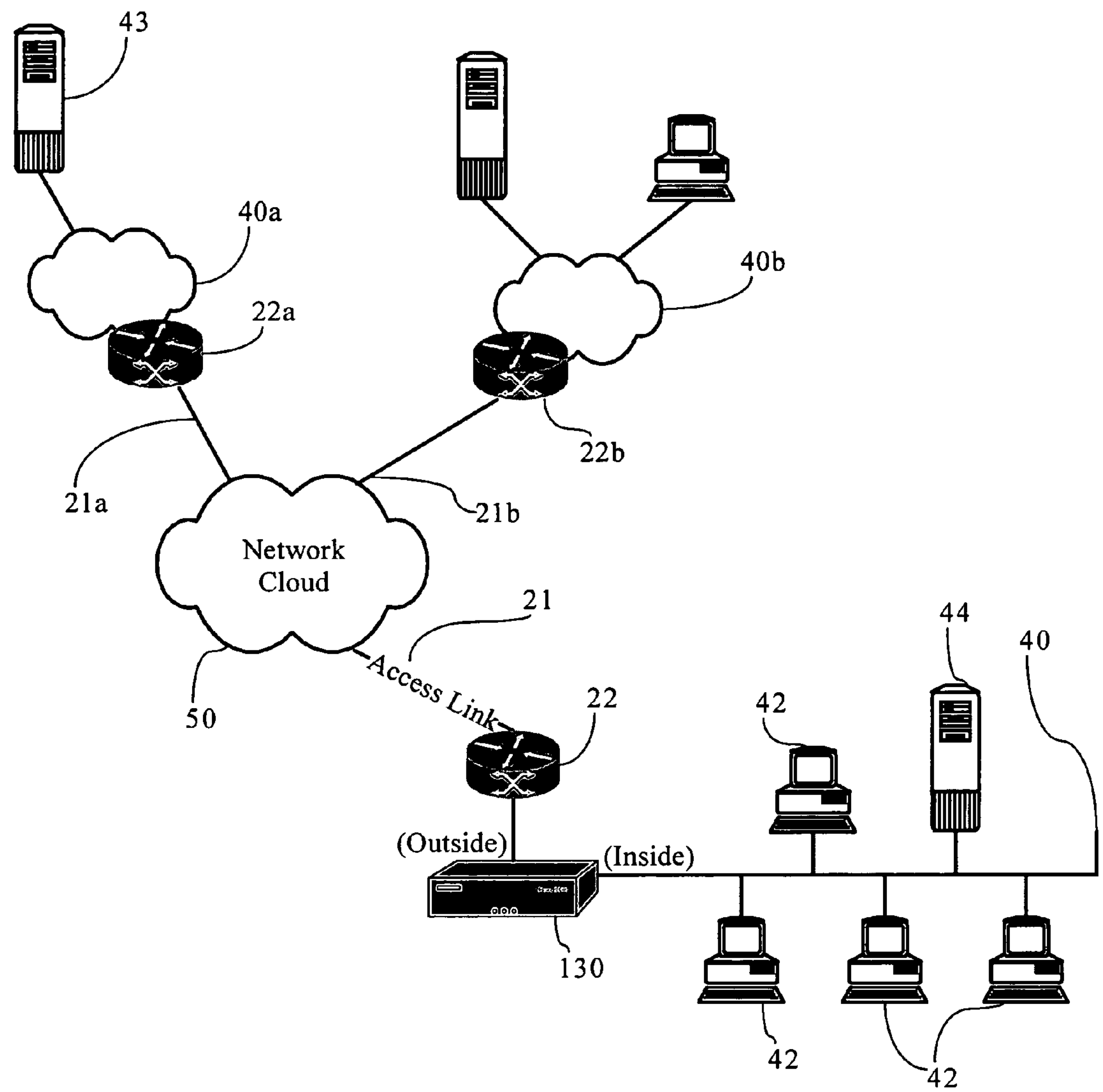
FIG. 1 is a functional block diagram illustrating a computer network system architecture in which aspects of the claimed embodiments may operate.

The following embodiments and aspects thereof are described and illustrated in conjunction with systems, apparatuses and methods which are meant to be exemplary and illustrative, not limiting in scope.

The claimed embodiments contemplate systems, apparatuses and methods for aggregate rate control utilizing a proportional/integral/derivative-type algorithm or more simply referred to as "PID." PID is a feedback loop methodology and is typically used in industrial control applications. When implemented, a system, method, apparatus or system utilizing PID will compare a measured value from a process with a reference setpoint value. The difference or "error" signal is then processed to calculate a new value for a manipulated process input, which new value then brings the process measured value back to its desired setpoint. Unlike simpler control algorithms, PID can adjust process inputs based on the history and rate of change of the error signal, which gives more accurate and stable control. Typically, a PID loop will produce a more accurate, stable control in cases where other control algorithms would either have a steady-state error or would cause the process to oscillate.

As applied to the claimed embodiments, PID is used, in one implementation, to control the rate of inbound traffic on a per-flow and/or an aggregate basis. In one implementation, rate control of data flows on an aggregate basis is done at the partition level by allocating data flows a per-flow fair share based on the bandwidth allocated to a given partition and the number of data flows currently falling within that partition. PID, in one implementation, can be used to attempt to increase the running rates of all the flows within the partition such that the sum of the running rates of all the flows will be equal to the bandwidth allocated to the partition.

PID as implemented by the claimed embodiments can simply be explained via the following example. If a partition has a fair share of 1 Mbps and there is one data flow. Ideally, this data flow should get a rate of 1 Mbps. A PID system of the claimed embodiments will calculate an advertised window size (for example, 'X' bytes) to be set on the TCP ACKs returned to the TCP transmitter to allow the data flow to consume more bandwidth.

Now when a new or second data flow falls in to the partition, both data flows will be controlled with a window size of 'X/2' bytes. So ideally both the flows should run at 500 Kbps each. If the sum of the running rate of the flows is different from the bandwidth allocated to the partition, the PID system will control the global window size (and thus the window size of each flow) accordingly to speed up or slow down all the flows.

To explain each of the terms in PID briefly, the "P" or proportional term is a constant, which is used to push the flow towards a target rate. The "I" or integral term acts as an exponential factor which will push the flow "faster" towards the target rate, while the "D" or derivative term acts as a negative term which stops the flow from growing too fast so that it does not overshoot the target rate. The I and D terms, in one implementation, are set to zero as soon as the flow reaches its target rate so that overshoot and undershoot is avoided or minimized. The only factor that will typically remain non-zero will be the P term. However, there may be some situations where the P term has a value of zero. Of course, once the running rate goes above or below its target rate, the I and D term will typically both act to push the data flow below or above the target rate respectively.

Controlling the flows in this manner has a lot of advantages. One advantage is that the same window size or target rate will be set for the flow sizes and thus the flow of packets can be controlled. As a result, the behavior of flows under rate control can be more easily predicted.

Figure 2:
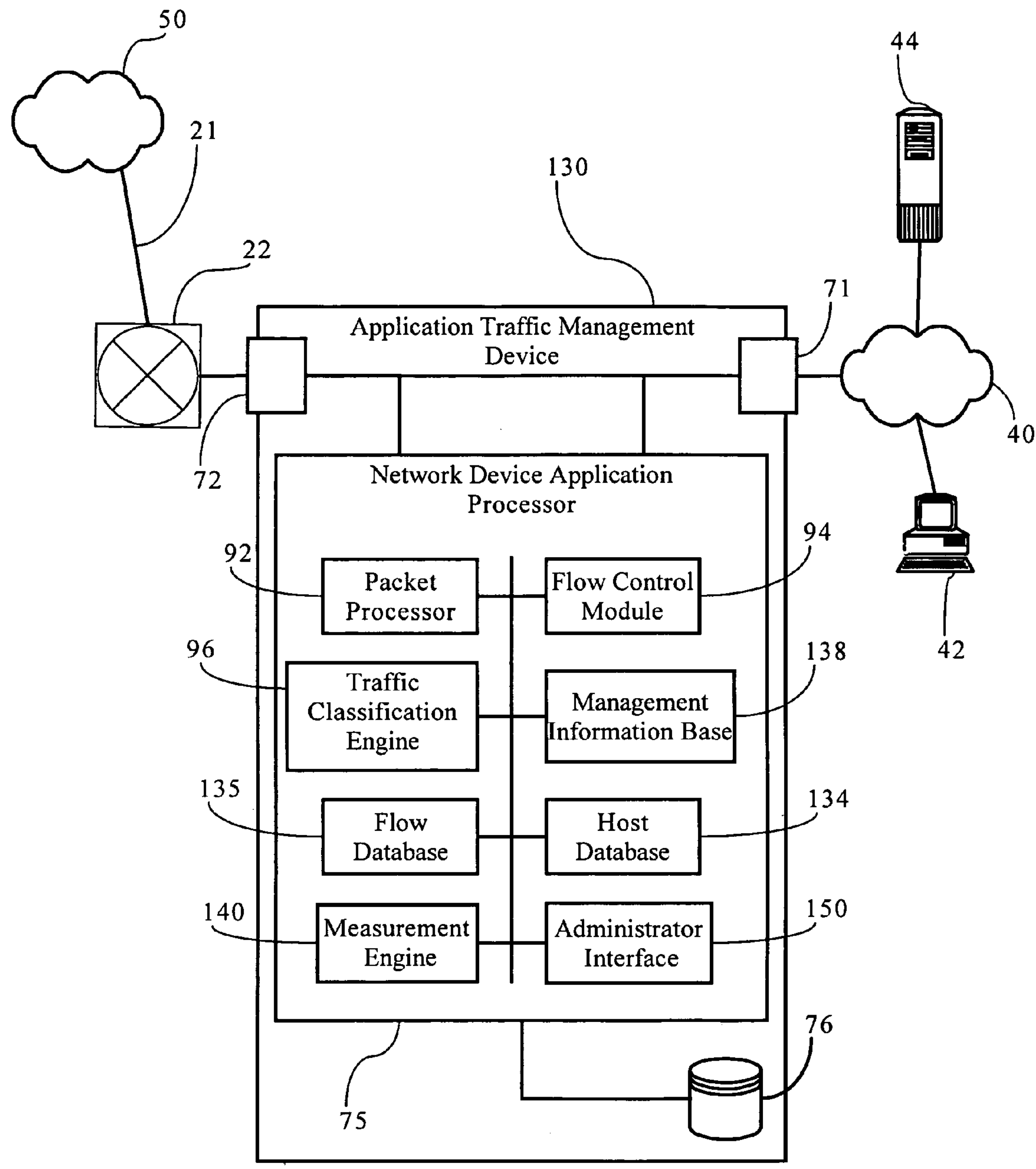
FIG. 2 is a functional block diagram illustrating the functionality of a network application traffic management device, in accordance with an exemplary embodiment.

Before the claimed embodiments are detailed, FIGS. 1-6 will first be described in order to convey a full understanding and appreciation of those claimed embodiments. FIG. 1 illustrates an exemplary network environment in which the claimed embodiments may operate. Of course, the claimed embodiments can be applied to a variety of network architectures. FIG. 1 illustrates, for didactic purposes, a network 50, such as wide area network, interconnecting a first network 40, supporting a central operating or headquarters facility (for example), and a second network 40*a*, supporting a branch office facility (for example). Network 50 may also be operably connected to other networks, such as network 40*b*, associated with the same administrative domain as networks 40, 40*a*, or a different administrative domain. As FIGS. 1 and 2 show, the first network 40 interconnects several TCP/IP end systems, including client devices 42 and server device 44, and provides access to resources operably connected to computer network 50 via router 22 and access link 21. Access link 21 is a physical and/or logical connection between two networks, such as computer network 50 and network 40. The computer network environment, including network 40 and network 50 is a packet-based communications environment, employing TCP/IP protocols (for example), and/or other suitable protocols, and has a plurality of interconnected digital packet transmission stations or routing nodes. First network 40, and networks 40*a* & 40*b*, can each be a local area network, a wide area network, combinations thereof, or any other suitable network. As FIGS. 1 and 2 illustrate, application traffic management device 130, in one implementation, is deployed at the edge of network 40. As discussed more fully below, application traffic management device 130 is operative to classify and manage data flows traversing access link 21. In one implementation, application traffic management device 130 also includes functionality operative to monitor the performance of the network (such as network latency) and/or network applications.

As FIG. 2 illustrates, network application traffic management device 130, in one implementation, comprises network device application processor 75, and first and second network interfaces 71, 72, which operably connect application traffic management device 130 to the communications path between router 22 and network 40. Network device application processor 75 generally refers to the functionality implemented by application traffic management device 130, such as network monitoring or reporting, application traffic management, and the like. In one embodiment, network device application processor 75 is a combination of hardware and software, such as a central processing unit, memory, a system bus, an operating system, device drivers, and one or more software modules implementing the functions performed by application traffic management device 130. For didactic purposes, application traffic management device 130 is configured to manage network traffic traversing access link 21. The above-identified patents and patent applications, incorporated by reference herein, disclose various functionalities and features that may be incorporated into application traffic management devices according to various implementations of the claimed embodiments.

In one embodiment, first and second network interfaces 71, 72 are the network communications interfaces that receive and transmit packets over the computer network environment. In one implementation, first and second network interfaces 71, 72 reside on separate network interface cards operably connected to the system bus of application traffic management device 130. In another implementation, first and second network interfaces reside on the same network interface card. In addition, the first and second network interfaces 71, 72 can be wired network interfaces, such as Ethernet (IEEE 802.3) interfaces, and/or wireless network interfaces, such as IEEE 802.11, BlueTooth, satellite-based interfaces, and the like. As FIG. 2 illustrates, application traffic management device 130, in one embodiment, includes persistent memory 76, such as a hard disk drive or other suitable memory device, such writable CD, DVD, or tape drives. In other implementations, application traffic management device 130 can include additional network interfaces, beyond network interfaces 71 and 72, to support additional access links or other functionality. Furthermore, U.S. application Ser. No. 10/843,185 provides a description of the operation of various modules (according to one possible implementation of the claimed embodiments), such as network interface drivers, and data structures for receiving into memory and processing packets encountered at network interfaces 71, 72.

As FIG. 2 illustrates, network device application processor 75, in one implementation, includes a packet processor 92, flow control module 94, and traffic classification engine 96. Network device application processor 75, in one implementation, further comprises host database 134, flow database 135, measurement engine 140, management information base 138, and administrator interface 150. In one embodiment, the packet processor 92 is operative to process data packets, such as detecting new data flows, parsing the data packets for various attributes (such as source and destination addresses, and the like) and storing packet attributes in a buffer structure, and maintaining one or more flow variables or statistics (such as packet count, current rate, etc.) in connection with the data flows and/or the source/destination hosts. The traffic classification engine 96, as discussed more fully below, is operative to classify data flows based on one or more attributes associated with the data flows. Traffic classification engine 96, in one implementation, stores traffic classes associated with data flows encountered during operation of application traffic management device 130, as well as manually created traffic classes configured by a network administrator, in a hierarchical traffic class structure. In one implementation, flow control module 94 is operative to apply aggregate and per-flow bandwidth utilization controls to data flows traversing the access link 21 in the inbound and/or outbound directions.

As discussed above, in one implementation, network device application processor 75 further comprises measurement engine 140, management information base (MIB) 138, and administrator interface 150. Management information base 138 is a database of standard and extended network objects related to the operation of application traffic management device 130. Measurement engine 140 maintains measurement and statistical data relating to operation of application traffic management device 130 to allow for monitoring of bandwidth utilization and network performance across access link 21 with respect to a plurality of bandwidth utilization and other network statistics on an aggregate, partition, and/or per-traffic-class level. In one implementation, measurement engine 140 tracks a variety of metrics, such as average queuing latency and average round trip time, corresponding to the partitions implemented by flow control module 94. These metrics allow flow control module 94, as discussed in more detail below, to dynamically adjust bandwidth allocations across flows and partitions to improve or manage network application performance.

Administrator interface 150 facilitates the configuration of application traffic management device 130 to adjust or change operational and configuration parameters associated with the device. For example, administrator interface 150 allows administrators to select identified traffic classes and associate them with traffic management policies, such as partitions. Administrator interface 150 also displays various views associated with a hierarchical traffic partitioning scheme and allows administrators to configure or revise the hierarchical traffic partitioning scheme. Administrator interface 150 can provide a command line interface and/or a graphical user interface accessible, for example, through a conventional browser on client device 42.

Figure 6:
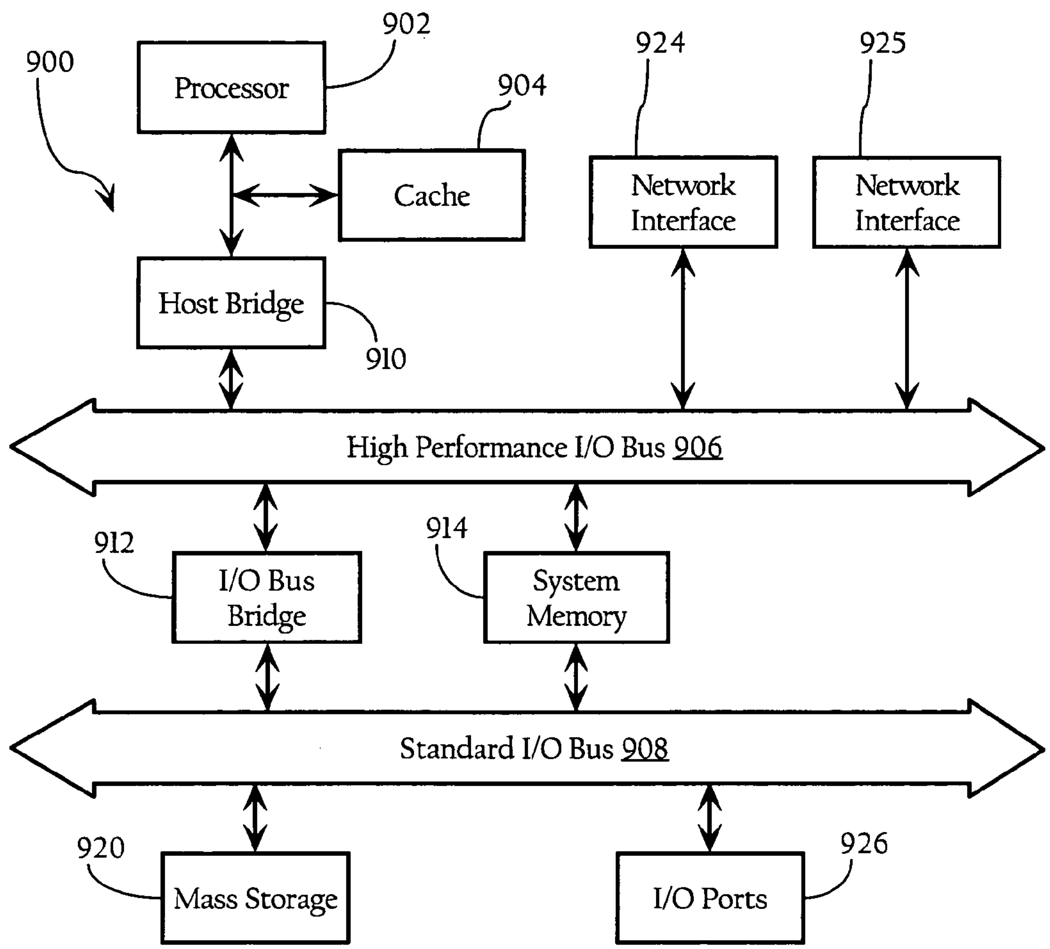
FIG. 6 is a functional block diagram illustrating the hardware components of a network application traffic management device, in accordance with an exemplary embodiment.

FIG. 6 illustrates for didactic purposes an exemplary computing platform, and hardware architecture, for network traffic management device 130. In one implementation, network traffic management device 130 comprises a processor 902, a system memory 914, network interfaces 924 & 925, and one or more software applications (including network device application 75 shown in FIG. 2) and drivers enabling the functions described herein.

The claimed embodiments can be implemented on a wide variety of computer system architectures. For example, FIG. 6 illustrates, hardware system 900 having components suitable for network traffic management device 130 in accordance with one implementation of the claimed embodiments. In the illustrated embodiment, the hardware system 900 includes processor 902 and a cache memory 904 coupled to each other as shown. Additionally, the hardware system 900 includes a high performance input/output (I/O) bus 906 and a standard I/O bus 908. Host bridge 910 couples processor 902 to high performance I/O bus 906, whereas I/O bus bridge 912 couples the two buses 906 and 908 to each other. Coupled to bus 906 are network/communication interface 924, and system memory 914. The hardware system may further include video memory (not shown) and a display device coupled to the video memory. Coupled to bus 908 are mass storage 920 and I/O ports 926. The hardware system may optionally include a keyboard and pointing device (not shown) coupled to bus 908. Collectively, these elements are intended to represent a broad category of computer hardware systems, including but not limited to general purpose computer systems based on the Pentium® processor manufactured by Intel Corporation of Santa Clara, Calif., as well as any other suitable processor.

The elements of computer hardware system 900 perform their conventional functions known in the art. In particular, network interfaces 924, 925 are used to provide communication between system 900 and any of a wide range of networks, such as an Ethernet (e.g., IEEE 802.3) network, etc. Mass storage 920 is used to provide permanent storage for the data and programming instructions to perform the above described functions implemented in the system controller, whereas system memory 914 (e.g., DRAM) is used to provide temporary storage for the data and programming instructions when executed by processor 902. I/O ports 926 are one or more serial and/or parallel communication ports used to provide communication between additional peripheral devices, which may be coupled to hardware system 900.

Hardware system 900 may include a variety of system architectures, and various components of hardware system 900 may be rearranged. For example, cache 904 may be on-chip with processor 902. Alternatively, cache 904 and processor 902 may be packed together as a "processor module," with processor 902 being referred to as the "processor core." Furthermore, certain implementations of the claimed embodiments may not require nor include all of the above components. For example, the peripheral devices shown coupled to standard I/O bus 908 may be coupled to high performance I/O bus 906. In addition, in some implementations only a single bus may exist with the components of hardware system 900 being coupled to the single bus. Furthermore, additional components may be included in system 900, such as additional processors, storage devices, or memories.

As discussed above, in one embodiment, the operations of the network traffic management device 130 described herein are implemented as a series of software routines run by hardware system 900. These software routines comprise a plurality or series of instructions to be executed by a processor in a hardware system, such as processor 902. Initially, the series of instructions are stored on a storage device, such as mass storage 920. However, the series of instructions can be stored on any conventional storage medium, such as a diskette, CD-ROM, ROM, etc. Furthermore, the series of instructions need not be stored locally, and could be received from a remote storage device, such as a server on a network, via network/communication interface 924. The instructions are copied from the storage device, such as mass storage 920, into memory 914 and then accessed and executed by processor 902.

An operating system manages and controls the operation of system 900, including the input and output of data to and from software applications (not shown). The operating system provides an interface between the software applications being executed on the system and the hardware components of the system. According to one embodiment of the claimed embodiments, the operating system is the Windows® 95/98/NT/XP operating system, available from Microsoft Corporation of Redmond, Wash. However, the claimed embodiments may be used with other conventional operating systems, such as the Apple Macintosh Operating System, available from Apple Computer Inc. of Cupertino, Calif., UNIX operating systems, LINUX operating systems, and the like. Of course, other implementations are possible. For example, the functionality of network traffic management device 130 may be implemented by a plurality of server blades communicating over a backplane.

A.1. Packet Processing

As discussed above, packet processor 92, in one implementation, is operative to detect new data flows, instantiate data structures associated with the flows and parse packets to identify packet attributes, such as source and destination addresses, port numbers, etc., and populate one or more fields in the data structures. The U.S. Patents and patent applications identified above discuss the operation of packet processors that can be incorporated into embodiments of the claimed embodiments. In one embodiment, when packet processor 92 encounters a new data flow it stores the source and destination IP addresses contained in the packet headers in host database 134. Packet processor 92 further constructs a control block (flow) object in flow database 135 including attributes characterizing a specific flow between two end systems, such as source and destination addresses, port numbers, etc. Other flow attributes in the flow object may include application specific attributes gleaned from layers above the TCP layer, such as codec identifiers for Voice over IP calls, Citrix database identifiers, and the like. Packet processor 92 also stores meta information relating to the received packets in a packet buffer—a memory space, typically in dynamic random access memory (DRAM), reserved for packets traversing application traffic management device 130. In one embodiment, the packets are stored in the packet buffer with a wrapper including various information fields, such as the time the packet was received, the packet flow direction (inbound or outbound), and a pointer to the flow object corresponding to the flow of which the packet is a part.

In typical network deployments, the majority of data flows are generally TCP or UDP flows. However, any suitable transport layer flow can be recognized and detected. As discussed more fully below, in one embodiment, flows are identified based on the following flow attributes: 1) source IP address, 2) destination IP address, 3) source port number, 4) destination port number, and 5) protocol (derived from the "protocol" field in IPv4 headers, and the "NextHeader" field in IPv6 headers). One skilled in the art will recognize that flows can be identified in relation to a variety of attributes and combinations of attributes. In addition, methods for determining new data flows and assigning packets to existing data flows are well known in the art and also depend on the particular transport layer protocol employed. For a TCP flow, for example, packet processor 92 can determine a new data flow by detecting the packets associated with the initial handshake, such as the SYN, SYN/ACK, and/or ACK packets. However, a new data flow, depending on the network protocol associated with the flow, can simply be a data flow for which there is no corresponding flow object. For example, with UDP and GRE flows (where there is no explicit connection or handshake mechanism, such as SYN packets), a new flow is recognized by associating the source and destination addresses and port numbers to the flow and the flow type (e.g., UDP, GRE, etc.). Accordingly, when a UDP packet identifies a new address/port pair, the attributes discussed above are stored in a data structure along with the time of last packet. A new UDP flow between the same address/port pairs can be determined by comparing the last packet time to a threshold value (e.g., 2 minutes). If the difference between the time of the last packet and the time of the current packet is greater than the threshold, the current packet is deemed part of a new flow. In another implementation, a background and/or separate process can periodically compare the last packet times associated with a flow to a threshold period of time and deem the flow terminated if the last packet time is beyond the threshold period of time. The termination of TCP connections is typically detected by identifying FIN packets; however, the timeout mechanisms discussed above can be used in situations where a FIN packet is not detected.

In one embodiment, a control block (flow) object contains a flow specification object including such attributes as pointers to the "inside" and "outside" IP addresses in host database 134, as well as other flow specification parameters, such as inside and outside port numbers, service type (see below), protocol type and other parameters characterizing the data flow. In one embodiment, such parameters can include information gleaned from examination of data within layers 2 through 7 of the OSI reference model. U.S. Pat. Nos. 6,046,980 and U.S. 6,591,299, as well as others incorporated by reference herein, disclose classification of data flows for use in a packet-based communications environment. FIGS. 1 and 2 illustrate the concept associated with inside and outside addresses, where network interface 71 is the "inside" network interface and network interface 72 is the "outside" network interface. As discussed above, in one embodiment, a flow specification object includes an "inside" and "outside" address relative to application traffic management device 130. See FIG. 1. For a TCP/IP packet, packet processor 92 can compute the inside and outside addresses based on the source and destination network addresses of the packet and the direction of the packet flow. Still further, packet processor 92 can also identify which host is the client and which host is the server for a given data flow and store this information in the flow specification or flow object. The identification of a server or client in a given transaction generally depends on the network protocols employed by the hosts. For example, in TCP flows, a client typically starts a transaction by transmitting a SYN packet to initiate a TCP connection. Application traffic management device 130 can detect the SYN packet and note the source network address of the packet as the client host, and the destination address as the server host. One of ordinary skill in the art will recognize how to identify clients and servers in connection with other networking protocols.

In one embodiment, packet processor 92 creates and stores flow objects corresponding to data flows in flow database 135. In one embodiment, flow object attributes include a pointer to a corresponding flow specification object, as well as other flow state parameters, such as TCP connection status, timing of last packets in the inbound and outbound directions, current observed running rate, apparent round trip time, packet count, etc. Flow object attributes further include at least one traffic class identifier (or pointer(s) thereto) associated with the data flow, as well as policy parameters (or pointers thereto) corresponding to the identified traffic class. In one embodiment, flow objects further include a list of traffic classes for which measurement data (maintained by measurement engine 140) associated with the data flow should be logged. In one embodiment, to facilitate association of an existing flow object to subsequent packets associated with a data flow or connection, flow database 135 further maintains a control block hash table including a key comprising a hashed value computed from a string comprising the inside IP address, outside IP address, inside port number, outside port number, and protocol type (e.g., TCP, UDP, etc.) associated with a pointer to the corresponding flow object. According to this embodiment, to identify whether a flow object exists for a given data flow, packet processor 92 hashes the values identified above and scans the hash table for a matching entry. If one exists, packet processor 92 associates the pointer to the corresponding flow object with the packets in the data flow.

A.2. Traffic Classification Engine

As discussed above, traffic classification engine 96, in one implementation, is operative to classify data flows into one of a plurality of traffic classes. Traffic classification engine 96, in one implementation, comprises a plurality of service type identification modules, each of which correspond to a set of service types. Each service type identification module analyzes one or more packets in a given data flow to attempt to identify a service type corresponding to the flow. A service type, in one implementation, can be a network protocol, a service, or a network-application. For example, one service type identification module can correspond to a network application, such as Citrix®, while another service type identification module can be dedicated to detecting Oracle® or PostgreSQL database traffic. Still other service type identification modules can classify HTTP flows, FTP flows, ICMP flows, RTP flows, NNTP, SMTP, SSL, DICOM and the like. In one implementation, traffic classification engine 96 passes pointers to received packets to each service type identification module, which then inspect the packets stored in the buffer memory. In one implementation, each service type identification module has an associated packet count threshold (in the aggregate, packets from server to client, or client to server) after which it no longer attempts to classify a data flow. In one implementation, the packet count threshold will vary across the service type identification modules. For example, a service type identification module dedicated to classifying Citrix® traffic may be able to classify a data flow with certainty after three packets. In many instances, application traffic management device 130 may have to encounter more than one packet corresponding to a data flow in order to finally classify the data flow. For example, the initial TCP handshake packets may only reveal IP address, port numbers and protocol identifiers. While this information may be sufficient to identify HTTP traffic, for example, additional packets (such as data packets) may reveal a more specific network application, such as an accounting application or peer-to-peer file sharing application, that utilizes HTTP. Accordingly, in one implementation, each service type identification module responds to receiving a pointer to a packet by 1) reporting a matching service type identifier and the desire to inspect more packets in the flow (to possibly identify a more specific service type identifier); 2) reporting a matching service type and no interest in inspecting subsequent packets in the flow; 3) reporting no matching service type identifier and the desire to inspect more packets in the flow; and 4) reporting no matching service type and no interest in inspecting subsequent packets in the flow.

To facilitate identification of service types (e.g., FTP, HTTP, etc.), traffic classification engine 96, in one embodiment, is supported by one to a plurality of service identification tables in a relational database that allow for identification of a particular service type (e.g., application, protocol, etc.) based on the attributes of a particular data flow. Of course, other suitable data structures can be used to support the identification of service types, such as a set of hard-coded instructions, an XML file, and the like. In one embodiment, a services table including the following fields: 1) service ID, 2) service aggregate (if any), 3) name of service, 4) service attributes (e.g., port number, outside IP address, etc.), and a 5) default bandwidth management policy. A service aggregate encompasses a combination of individual services (each including different matching criteria, such as different port numbers, etc.) corresponding to the service aggregate. When application traffic management device 130 encounters a new flow, the service type identification modules of traffic classification engine 96 analyze the data flow against the service attributes in their respective services tables to identify a service ID corresponding to the flow. In one embodiment, traffic classification engine 96 may identify more than one service ID associated with the flow. In this instance, traffic classification engine 96 associates the more/most specific service ID to the flow. For example, network traffic associated with a peer-to-peer file sharing service may be identified according to a network protocol, such as TCP or HTTP traffic, as well as higher level, application-specific traffic types such as the actual file sharing application itself (e.g., Napster, Morpheus, etc.). In this instance, traffic classification engine 96 associates the flow with the most specific service ID. As a further example, an RTSP application data flow can be further classified to RTSP-Broadcast or RTSP-REALNET-TCP in the middle of the flow after a particular signature in the packets is encountered. In one implementation, traffic classification engine 96 writes the identified service type ID into the control block (flow) object corresponding to the data flow.

As discussed more fully below, service type identification, in one implementation, is a preliminary operation to the classification of a data flow according to the traffic classification scheme configured by a network administrator. For example, a traffic class maintained by traffic classification engine 96 may be configured to include matching rules based on the service IDs in the services table. For example, a matching rule directed to HTTP traffic may simply refer to the corresponding service ID, as opposed to the individual attributes that the service type identification modules uses to initially identify the service. This implementation allows for a variety of traffic classification configurations, such as the configuration of child traffic classes that further classify HTTP traffic on the basis of a network application, a range of IP addresses, and the like. Still further, the service type identifiers can correspond to a specific network application (e.g., Napster, Citrix, NetIQ, Oracle, Skype, etc.) and more generally to network protocols or services, such as IP, TCP, HTTP, SOAP, XML, UDP, FTP, SMTP, FTP, UDP, etc.

A traffic class comprises a set of matching rules or attributes allowing for logical grouping of data flows that share the same characteristic or set of characteristics. In one implementation, the matching rules can correspond to the service type identifiers discussed above, as well as other data flow attributes, such as the network interface on which the packets are received by application traffic management device 130, whether the server is the inside or outside host (see above), non-standard and standard port numbers, host IP address or subnet, MAC address, application-specific strings, diffserv codes, MPLS tags, VLAN tags, and the like. In one embodiment, each traffic class has at least one attribute defining the criterion(ia) used for identifying a specific traffic class. In one implementation, the attributes defining a given traffic class can be based on explicitly presented attributes of one or more packets corresponding to a data flow (as discussed above), or be based on behavioral attributes of the end systems associated with the flow. The U.S. patent applications identified above disclose various network traffic classification mechanisms that can be incorporated into embodiments of the claimed embodiments. For example, a traffic class can be defined by configuring an attribute defining a particular IP address or subnet. Of course, a particular traffic class can be defined in relation to a plurality of related and/or orthogonal data flow attributes. U.S. Pat. Nos. 6,412,000 and 6,591,299, and U.S. patent application Ser. No. 10/039,992 describe some of the data flow attributes that may be used to define a traffic class, as well as the use of hierarchical classification structures to associate traffic classes to data flows. In one embodiment, application traffic management device 130 includes functionality allowing for classification of network traffic based on information from layers 2 to 7 of the OSI reference model. Application traffic management device 130 can be configured to include matching rules that define a plurality of network applications commonly found in enterprise networks, such as database applications, Citrix® flows, ERP applications, and the like. As discussed below, the matching rules or attributes for a traffic class may be based on various types of node behavior, such as the number of concurrent connections of the inside or outside host.

In one embodiment, application traffic management device 130 is configured to include a predefined set of traffic classes based upon a knowledge base gleaned from observation of common or known traffic types on current networks. Application traffic management device 130, in one embodiment, also allows an administrator to manually create a traffic class by specifying a set of matching attributes. As discussed above, administrator interface 150, in one embodiment, allows for selection of a traffic class and the configuration of traffic management policies for the selected traffic class. Administrator interface 150, in one embodiment, also allows for the selection and arrangement of traffic classes into hierarchical reference trees. In one embodiment, traffic classification engine 96 also stores traffic classes added by the traffic discovery module. Furthermore, as discussed below, application traffic management device 130 may also include traffic class discovery functionality that automatically adds traffic classes to traffic classification engine 96 in response to data flows traversing the device. Automatic network traffic discovery and classification (see below) is disclosed in U.S. Pat. Nos. 6,412,000, 6,457,051, and 6,591,299, which are incorporated herein by reference.

Traffic classification engine 96, in one implementation, stores traffic classes associated with data flows that traverse access link 21. Traffic classification engine 96, in one embodiment, stores the traffic classes and corresponding data (e.g., matching rules, policies, partition pointers, etc.) related to each traffic class in a hierarchical tree. This tree is organized to show parent-child relationships—that is, a particular traffic class may have one or more subordinate child traffic classes with more specific characteristics (matching rules) than the parent class. For example, at one level a traffic class may be configured to define a particular user group or subnet, while additional child traffic classes can be configured to identify specific application traffic associated with the user group or subnet. U.S. application Ser. No. 10/334,467, as well as other patents and patent applications identified above, disclose how traffic classification engine 96 traverses the hierarchical tree to match a data flow to a leaf traffic class node.

In one embodiment, the root traffic classifications are "/Inbound" and "/Outbound" data flows. Any data flow not explicitly classified is classified as "/Inbound/Default" or "/Outbound/Default". In other implementations, the concept of "inbound" and "outbound" is replaced by a set of policies corresponding to pairs of network interfaces, such as interfaces 71 and 72, and the direction of packet traffic. For example, packets flowing from network interface 71 to network interface 72 (and vice versa) can be classified on that basis to eliminate any potential restrictions on classification of data flows in different network topologies. A "LocalHost" traffic class, in one implementation, corresponds to packets and data flows destined for application traffic management device 130, such as requests for stored measurement data, traffic class mapping packets, or device configuration changes. In one embodiment, traffic classification engine 96 attempts to match to a leaf traffic class node before proceeding to remaining traffic class nodes in the hierarchical configuration. If a traffic class is found, the traffic classification engine 96 stops the instant search process and returns the identified traffic classification. Of course, one skilled in the art will recognize that alternative ways for traversing the hierarchical traffic class configuration can be implemented. For example, traffic classification engine 96 may be configured to traverse all traffic class nodes at a given level before proceeding to lower levels of the traffic classification tree.

In one embodiment, administrator interface 150 displays the traffic class tree and allows for selection of a traffic class and the configuration of policy (such as a partition) for that traffic class. Application traffic management device 130 further allows an administrator to manually create a traffic class by specifying a set of matching rules and also automatically creates traffic classes by monitoring network traffic across access link 21 and classifying data flows according to a set of criteria to create matching rules for each traffic type. In one embodiment, each traffic class node includes a traffic class identifier; at least one traffic class (matching) attribute; at least one policy parameter (e.g., a partition identifier, etc.), a pointer field reserved for pointers to one to a plurality of child traffic classes.

A.3. Flow Control Module

As discussed above, flow control module 94 enforces bandwidth utilization controls (and, in some embodiments, other policies) on data flows traversing access link 21. A bandwidth utilization control for a particular data flow can comprise an aggregate control bandwidth utilization control (e.g., a partition), a per-flow bandwidth utilization control (e.g., a rate policy), or a combination of the two. Flow control module 132 may incorporate any or a subset of the TCP rate control functionality described in the cross-referenced U.S. patents and/or patent applications set forth above for controlling the rate of data flows. Application traffic management device 130, however, can also be configured to implement a variety of different policy types, such as security policies, admission control policies, marking (diffserv, VLAN, etc.) policies, redirection policies, caching policies, transcoding policies, and network address translation (NAT) policies. Of course, one of ordinary skill in the art will recognize that other policy types can be incorporated into the claimed embodiments.

In one implementation, flow control module 94 includes a partitioning module operative to enforce aggregate bandwidth utilization controls (e.g., partitions) on data flows. Enforcing partitions by application traffic management device 130 across access link 21 must be performed in two different manners relative to inbound and outbound flows. As to outbound flows, application traffic management device 130 is in a position allowing for direct control of the packets that are serialized onto access link. Flow control module 94 can use any suitable functionality to enforce aggregate bandwidth utilization controls known in the art, including, but not limited to weighted fair queuing, class-based weighted fair queuing, Committed Access Rate (CAR) and "leaky bucket" techniques. In one implementation, flow control module 94 implements the deterministic partition scheduling functionality disclosed in U.S. application Ser. No. 10/108,085, incorporated by reference herein.

As to inbound flows, however, application traffic management device 130 is not in a position to directly control utilization of access link by the data flows. As discussed in more detail below, flow control module 94 utilizes TCP rate control functionality to control the rate of inbound data flows, where the target rate for each flow is set in a manner that depends on the bandwidth allocated to the partition and the number of flows in that partition. In one implementation, as discussed in more detail below, by controlling the inbound transmission rate at application traffic management device 130 relative to the bandwidth allocated to a partition, the aggregate bandwidth consumed by inbound network traffic as it traverses access link 21 can be controlled. In one implementation, flow control module 94 implements the TCP Rate Control technologies disclosed in U.S. Pat. No. 6,038,216 to control the rate at which transmitters send data and therefore the amount of data that is queued in buffers at application traffic management device 130.

As discussed more fully below, flow control module 94 monitors bandwidth demand across the data flows in each partition relative to an aggregate allocation scheme, and dynamically modifies per-flow rate controls to attempt to control each data flow at a target rate such that the bandwidth allocated to a given partition is fully utilized. Flow control module 94 performs these dynamic allocation adjustments on a continuous basis, as needed. In one implementation, the demand for bandwidth at a given partition can be evaluated in a number of ways. For example, the size of, and rate at which, packets in a flow are received by application traffic management device 130 during a given time interval can be monitored to compute a running rate. In addition, to facilitate the determinations as to how to modulate flow control parameters to achieve a target rate, certain implementations monitor, for each partition, average queuing latency and round trip time. In addition, these monitored values can be smoothed by maintaining a rolling average or weighted moving average across a sliding window of time.

A.3.a. Partition Configuration

According to one implementation of the claimed embodiments, the user configuration interface implemented by application traffic management device 130 allows the user to configure a bandwidth partition scheme. In one implementation, the partition configuration can directly map, on a one-to-one basis, to the hierarchical traffic class configuration used to classify network traffic, where all traffic gets matched to a leaf node in the traffic class tree. However, in other implementations, the partition configuration may be orthogonal to the traffic class configuration. Similar to the traffic class tree, the root partition node represents the capacity of the access link in either the inbound or outbound directions. In one implementation, separate partition configurations and controls can be maintained for data flows traveling in the inbound or outbound directions relative to network 40. In other implementations, a single partition configuration can be applied to both inbound and outbound data flows.

Once a partition is established, in one implementation, a user can configure a bandwidth allocation for the partition. For example, a partition can be configured to protect a network traffic class by guaranteeing a defined amount of bandwidth and/or limit a network traffic class by placing a cap on the amount of bandwidth a traffic class can consume. Such partitions can be fixed or "burstable." A fixed partition allows a traffic class to use in the aggregate a defined amount of bandwidth. A fixed partition not only ensures that a specific amount of bandwidth will be available, but it also limits data flows associated with that traffic class to that same level. A burstable partition allows an aggregate traffic class to use a defined amount of bandwidth, and also allows that traffic class to access additional unused bandwidth, if needed. A cap may be placed on a burstable partition, allowing the traffic class to access up to a maximum amount of bandwidth, or the burstable partition may be allowed to potentially consume all available bandwidth across the access link. Given the nature of partitions according to the implementations discussed above, the bandwidth allocated to a partition at any given time can vary as data flows traverse application traffic management device 130, and one or more partitions are allowed to consume additional bandwidth.

After the user has completed a configuration, administrator interface 150, in one implementation, processes the configuration to create an aggregate bandwidth allocation scheme that includes partitions, and per-flow rate policies, based on the received configuration. For example, partition queues are created for each partition, and weighted, fair share bandwidth allocations are computed for the partitions, as discussed in more detail below. In addition, in one implementation, each active data flow within a given partition is also guaranteed a fair share of the bandwidth allocated to the partition. As discussed above, the allocation for each partition is generally stable, unless there are configuration changes or bursting is allowed. However, the fair share allocation for each flow changes dynamically based on the number of active flows in the partition. In addition, the actual bandwidth allocated to a given partition at a given point in time may change dynamically in response to network traffic demands.

A.3.b. Overall Packet Processing Flow

Figure 4:
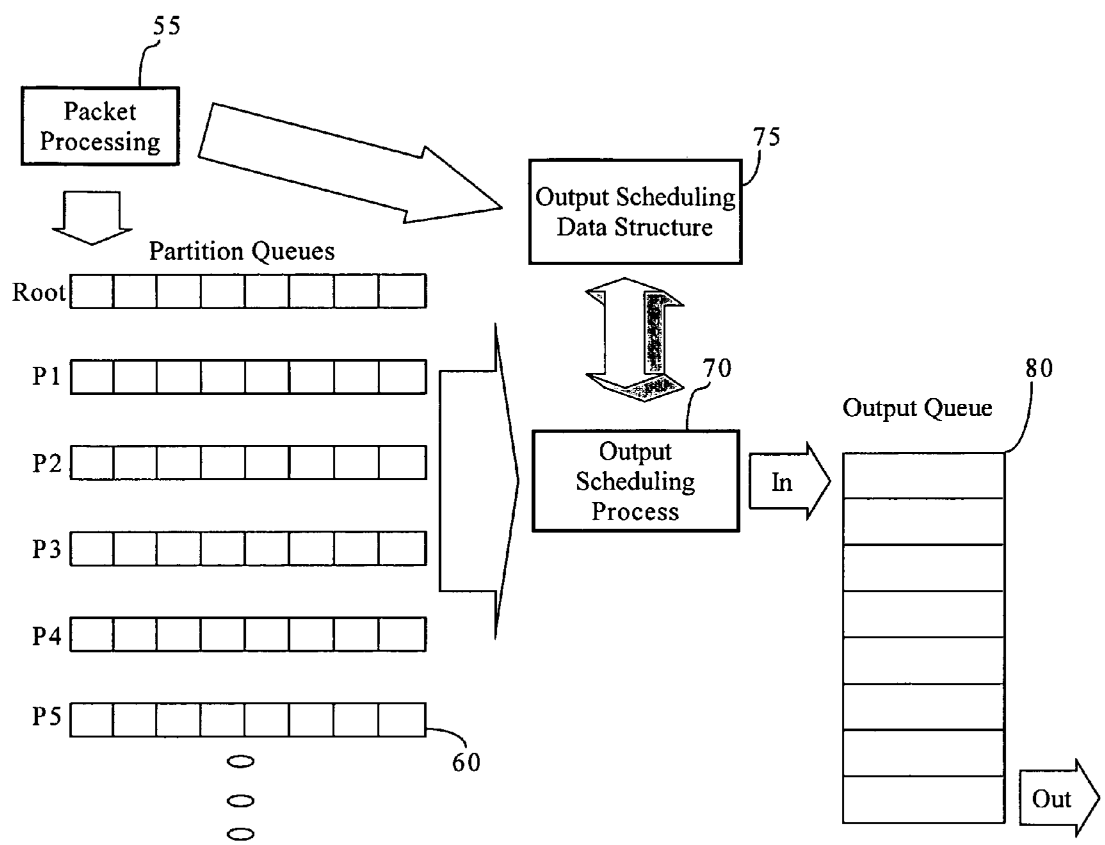
FIG. 4 is a process flow diagram illustrating the overall process flow associated with the scheduling of packets for output, in accordance with an exemplary embodiment.
Figure 5:
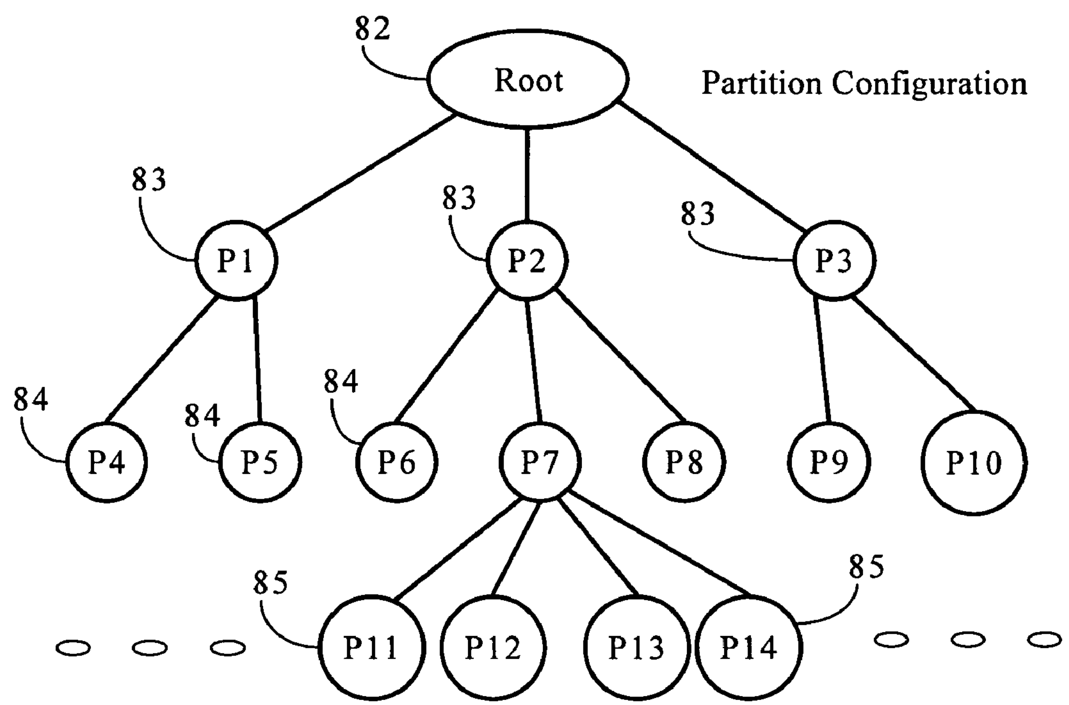
FIG. 5 sets forth an exemplary hierarchical partition configuration, in accordance with an exemplary embodiment.

FIG. 5 provides, for didactic purposes, an exemplary hierarchical partition configuration. Root partition node 82 represents the total capacity of access link 21 in either the outbound or inbound direction. In one implementation, separate data structures and processes are maintained for the outbound and inbound directions. Partition nodes 83 represent a first set of partitions allocating the capacity of access link at a first level. As FIG. 5 shows, each parent partition may include child partitions represented as partition nodes 83 and 84. For didactic purposes, assume that access link 21 is a T1 line and, thus, provides maximum available bandwidth of 1.5 Mbps. Partitions P1, P2, and P3 may be configured with weights, as discussed above, to equally divide access link 21 into 0.5 Mbps partitions at a first level. In addition, child partitions P4 and P5 may further divide parent partition P1 into a 0.2 Mbps partition (P4) and a 0.3 Mbps partition (P5). Similarly, child partitions P6, P7 and P8 may divide parent partition P2 into two 0.1 Mbps partitions (P6 and P8), and a 0.3 Mbps partition (P7). As discussed above, the initial aggregate bandwidth allocations may also be derived from weights associated with the partition nodes. Of course, any suitable partition configuration may be employed. Still further, other configurations are possible. For example, the root node may represent the access link in both the inbound and outbound direction, while child partitions from the root can correspond to traffic encountered at a given network interface (such as interface 71) and destined for egress from a second network interface (such as interface 72). FIG. 4 illustrates the overall process flow associated with an output scheduling process according to an embodiment of the claimed embodiments directed to enforcing partitions for outbound data flows across access link 21. In one implementation, flow control module 94 implements the deterministic output scheduling process disclosed in U.S. application Ser. No. 10/108,085 to schedule packets in the partitions queues for output across access link 21. For example, application traffic management device 130 processes packets traversing it to identify traffic classes and corresponding partitions associated with the packets (see FIG. 4, # 55). Application traffic management device 130 then pushes the packets or pointers to the packets on corresponding flow queues, which themselves are pushed onto corresponding partition queues 60. In one embodiment, if the partition associated with the packets was previously inactive, the packet processing process 55 also updates output scheduling data structure 75 to add a corresponding partition identifier, as discussed in U.S. application Ser. No. 10/108,085, to allow for scheduling of the packets for output. As FIG. 4 illustrates, an output scheduling process 70 operates on output scheduling data structure 75 to select partitions, pops packets off partition queues, and pushes the packets on output queue 80, according to the methods described herein. Another process associated with application traffic management device 130 releases the packets from output queue 80 and performs other processes such as logging of data associated with measurement engine 140. Enforcement of partitions as to inbound data flows is described in more detail below.

Figure 3:
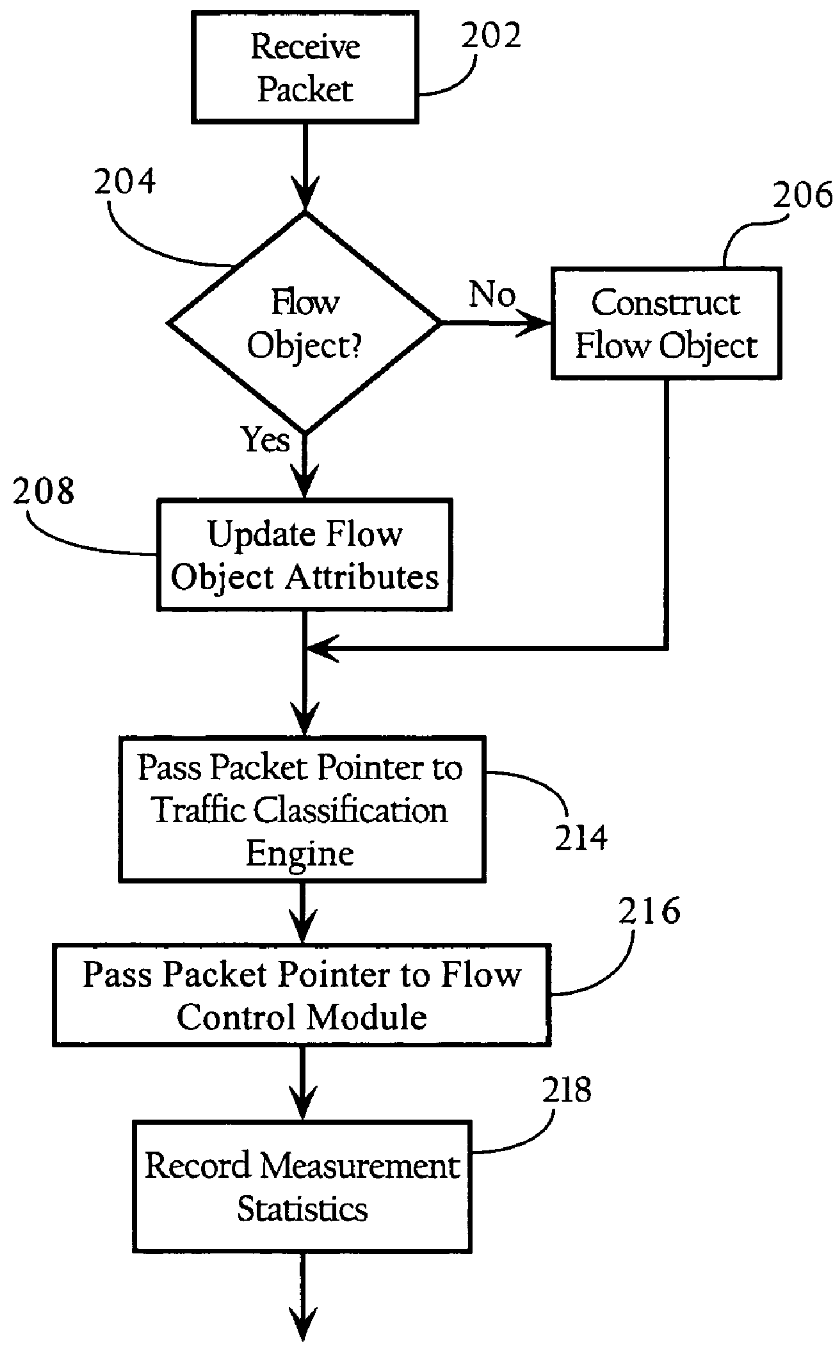
FIG. 3 is a flow chart diagram illustrating a method, in accordance with an exemplary embodiment, directed to processing data flows.

FIG. 3 illustrates the overall process flow, according to one implementation of the claimed embodiments, directed to the operation of application traffic management devices 130. In one embodiment, packet processor 92 receives a data packet (FIG. 3, 202) and determines whether flow database 135 contains an existing flow object corresponding to the data flow (204) (see Section A.1., supra). If no flow object corresponds to the data packet, packet processor 92 constructs a flow object including attributes characterizing the data flow, such as source address, destination address, etc. (206) (see above). In one embodiment, packet processor 92 analyzes the source and destination IP addresses in the packet header and scans host database 134 for matching entries. If no matching entries exist, packet processor 92 creates new entries for the source and destination IP addresses. As discussed above, in one embodiment, a flow object contains a flow specification object including such attributes as pointers to the "inside" and "outside" IP addresses in host database 134, as well as other flow specification parameters, such as inside and outside port numbers, protocol type, pointers to variable-length information in a dynamic memory pool, and other parameters characterizing the data flow. In addition, packet processor 92 also computes an estimated initial data rate for the flow (207). In one implementation, packet processor 92 uses the rapid data rate detection technologies disclosed in U.S. Pat. No. 5,802,106 to provide an initial estimate of the data rate for the flow. In one implementation, the estimated data rate is stored in a field of the flow object. In one implementation, this initial rate estimate is replaced, as more packets in the flow traverse application traffic management device 130, by a current rate based on weighted moving average over an analysis interval.

As FIG. 3 illustrates, packet processor 92 updates, for existing data flows, attributes of the flow object in response to the packet such as the packet count, last packet time, and the like (208). Packet processor 92 can also perform other operations, such as analyzing the packets for connection state information. For example, packet processor 92 can inspect various TCP flags to determine whether the received packet is part of a new data flow or represents a change to an existing data flow (such as the first data packet after the TCP handshake). Methods for determining new data flows and assigning packets to existing data flows are well known in the art and also depend on the particular transport layer protocol employed. For a TCP packet, packet processor 92 can determine a new data flow by detecting SYN and/or SYN/ACK packets. However, a new data flow can simply be a data flow for which there is no corresponding flow object in flow database 135. In addition, with UDP and GRE flows (where there is no explicit connection mechanism, such as SYN packets), a new flow is recognized by associating the source and destination addresses and port numbers to the flow and the flow type (e.g., UDP, GRE, etc.). Accordingly, when a UDP packet identifies a new address/port pair, the attributes discussed above are stored in a data structure along with the time of last packet. A new UDP flow between the same address/port pairs can be determined by comparing the last packet time to a threshold value (e.g., 2 minutes). If the difference between the time of the latest packet and the time of the last packet is greater than the threshold, the new packet is deemed part of a new flow. In another embodiment, a separate process monitors the last packet times associated with UDP, GRE and similar flow types to detect termination of a given flow. In one implementation, this separate process can also be passed pointers to TCP FIN packets to adjust various data structures, such as reallocating flow object space to a pool of available memory, adjusting flow counts in traffic class or partition objects.

As FIG. 3 illustrates, packet processor 92 then passes a pointer to the packet, in one implementation, to traffic classification engine 96, which operates as discussed above to classify the data flow to facilitate identification of a partition corresponding to the data flow (214). Lastly, the packet is passed to flow control module 94 (218), which performs flow control operations on the data packets. For example, flow control module 94 identifies the appropriate partition to which the packet belongs, and applies the partition and per-flow policies to the packet. As FIG. 3 illustrates, application traffic management device 130 may also perform other operations in response to arrival of the packet. For example, measurement engine 140 may record certain measurement variables on an aggregate or per-traffic class basis (218). For example, measurement engine 140 may include one or more traffic class and partition objects that maintain statistics or other parameters used by flow control module 94 to dynamically adjust aggregate and per-flow bandwidth allocations. For example, each partition object, in one implementation, may include the following statistics: 1) a flow count (the number of currently active flows); 2) current rate (a weighted moving average in bps of the rate observed for the flows in the class); 3) average queuing delay; and 4) average round trip time. In addition, per-flow statistics are also maintained, such as the current rate of the flow (a weighted moving average over an analysis interval of the rate at which packets are transmitted from application traffic management device), packet count, and the like. One skilled in the art will recognize that the order of processing operations illustrated in FIG. 3 is one possible process flow and that the flow control processes described herein can be performed at other points in the packet processing path.

A.3.c. PID-Based Control of Data Flows

Now that an exemplary framework for practicing the claimed embodiments has been described, the specific details of those claimed embodiments will now be discussed beginning with FIG. 7 which is a block diagram 300 illustrating a PID engine 302 that can be implemented via the network application traffic management device 130 of FIG. 2, in accordance with an exemplary embodiment. PID engine 302 computes PID terms/values (303) that are used to direct a flow towards a target running rate. As previously alluded to, the PID terms are a proportional term, an integral term and a derivative term. These PID terms, in one implementation, are calculated based on numerous inputs such as a partition identifier and the number of flows within the partition (304), the current running rate of a data flow (306), current bandwidth allocated to the partition (308), average round trip time ("RTT") for the partition (310), which, in one implementation, is the time between the transmission of a packet from a source and receipt of a corresponding acknowledgement. And an additional input is an average queuing latency (312) which is an average time that a packet is buffered in a given partition queue prior to being scheduled for output. Queuing latency can be defined in several ways. For example, one definition of an average queuing latency could be the average time for a packet to be processed through the partition queue 60, the output scheduling process 70 and the output queue 80. In another embodiment, the average queuing latency may be the time period for a packet to be processed through the entire traffic management device 130.

Figure 7:
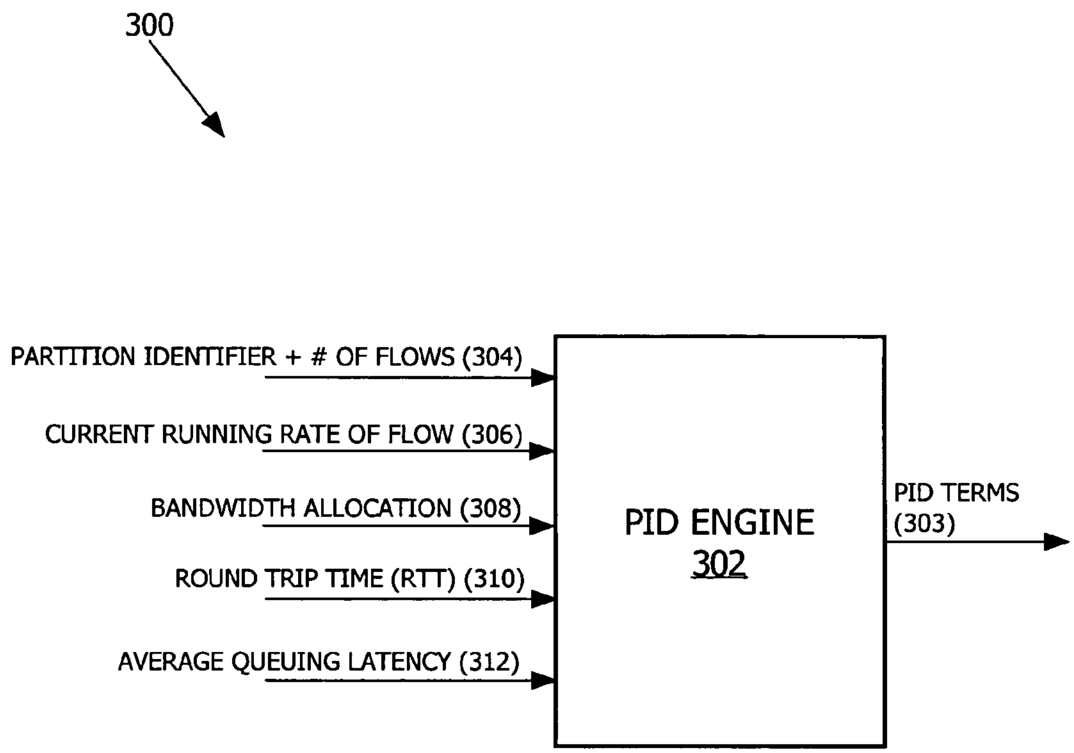
FIG. 7 is a block diagram illustrating a PID engine that can be implemented via the network application traffic management device of FIG. 2, in accordance with an exemplary embodiment.
Figure 8:
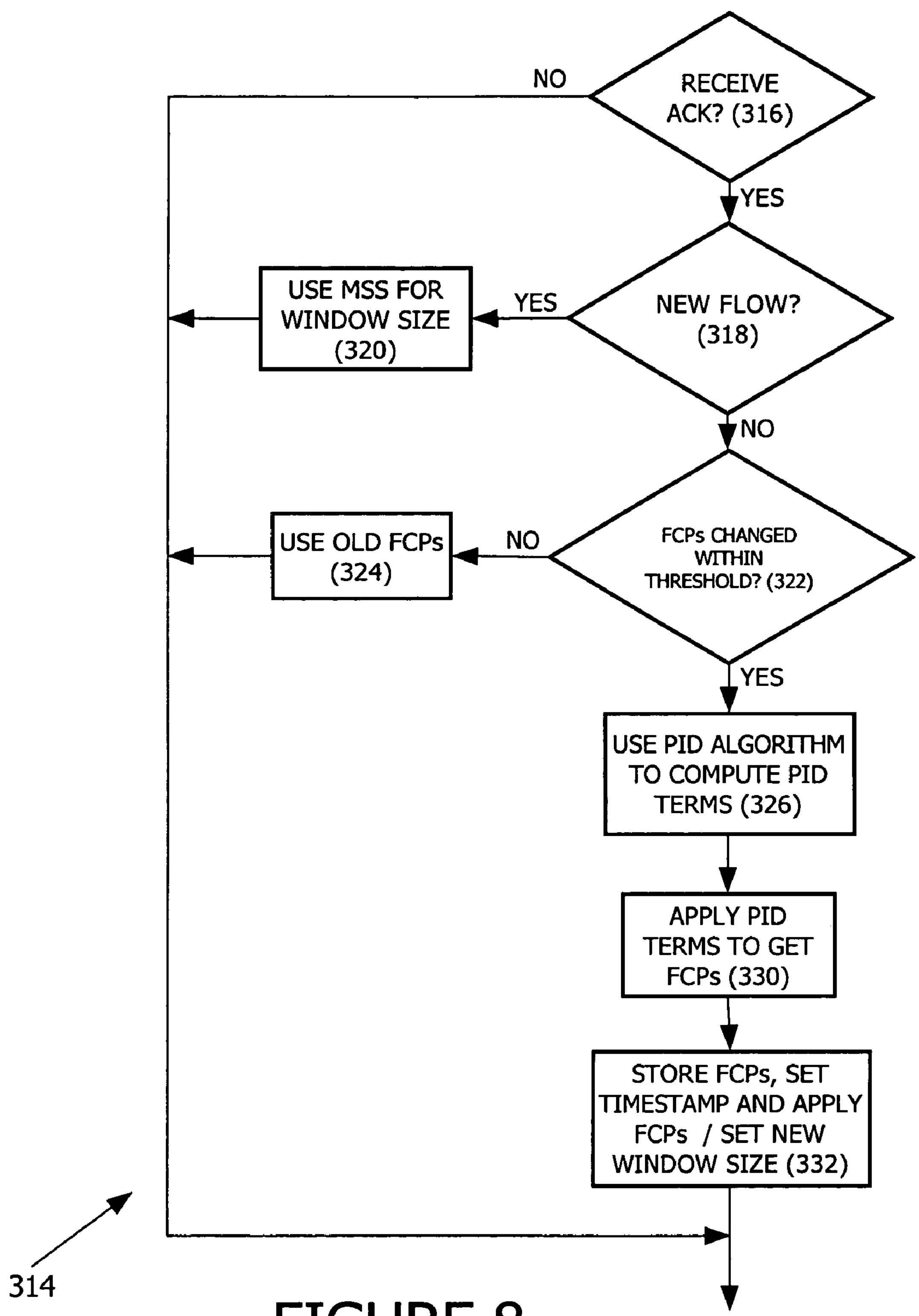
FIG. 8 is a flow chart diagram illustrating a method for implementing rate control on a flow using PID, in accordance with an exemplary embodiment.
Figure 9:
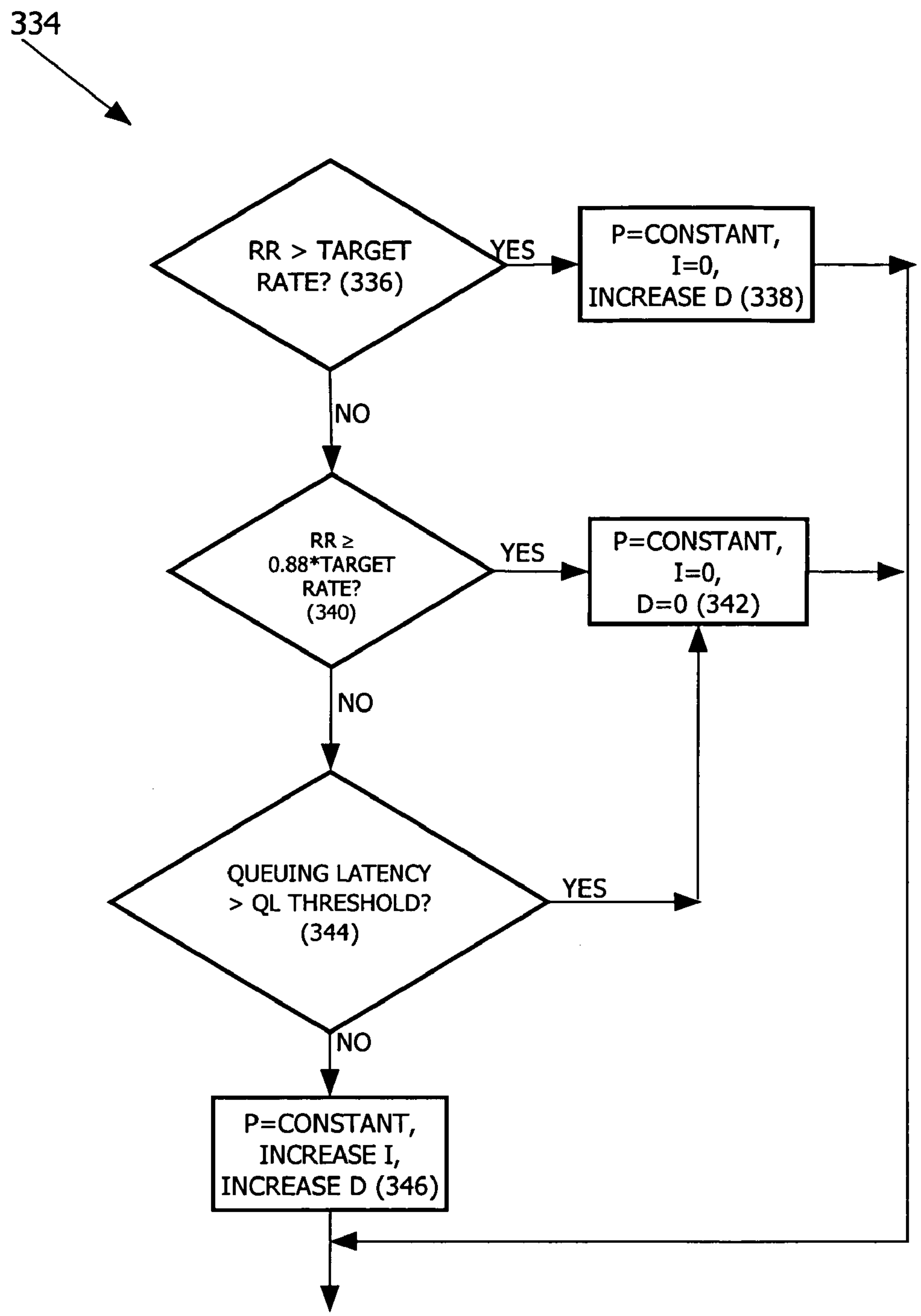
FIG. 9 is a flow chart diagram illustrating a method for adjusting PID terms, in accordance with an exemplary embodiment.
Figure 10:
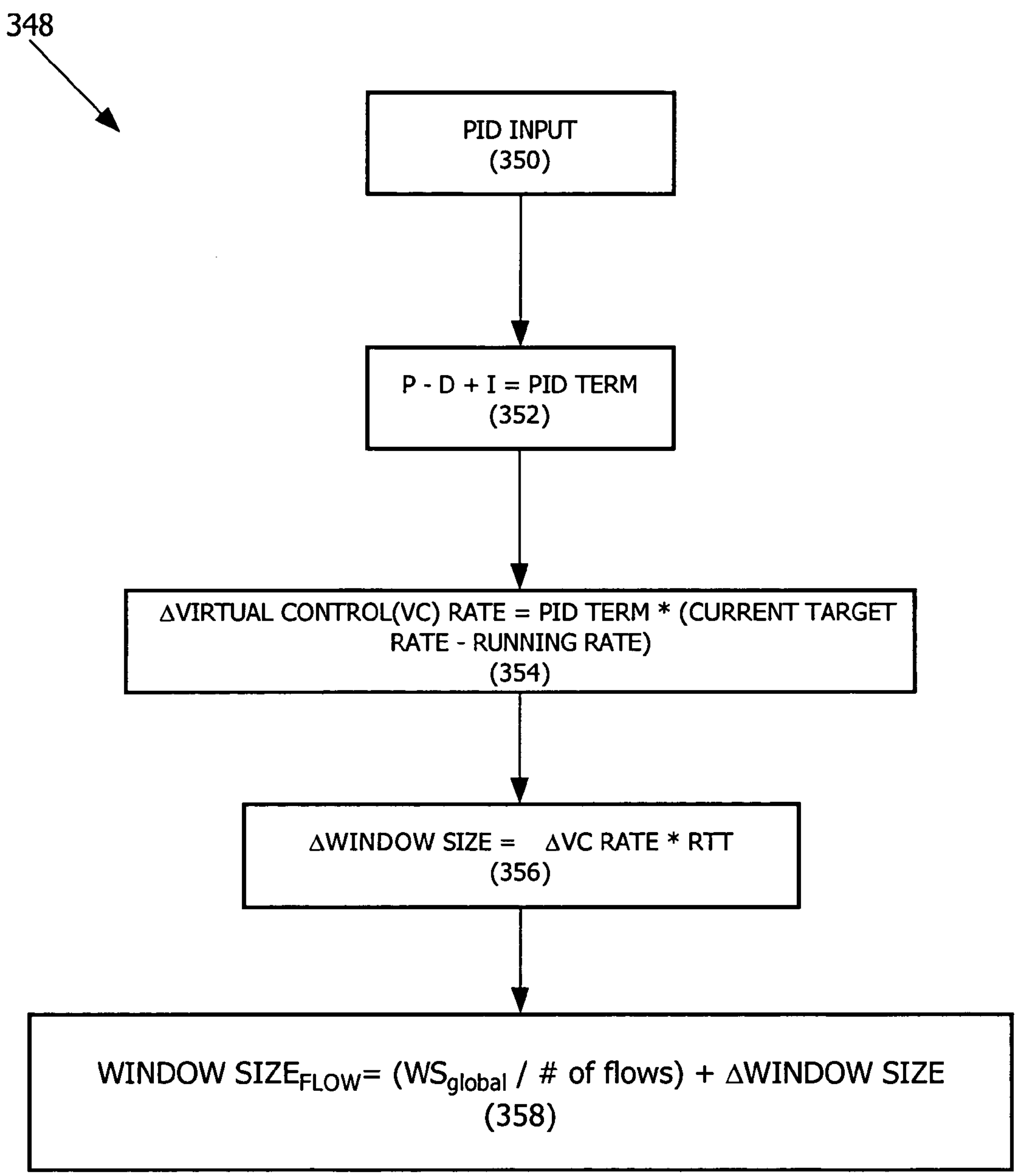
FIG. 10 is a flow chart diagram illustrating a method for using PID terms to calculate a window size, in accordance with an exemplary embodiment.

FIGS. 8-10 illustrate various, inter-related methods that utilize the PID terms (303) of FIG. 7. The methods of FIGS. 8-10 can all be executed, for example, by the network application traffic management device 130 of FIG. 2 which in turn can be implemented in the architecture 900 of FIG. 6.

FIG. 8 is a flow chart diagram illustrating a method 314 for implementing rate control on a flow using PID, in accordance with an exemplary embodiment. Generally speaking, method 314 encompasses a process of adjusting one or more flow control parameters (FCPs) to attempt to control the flow at its target rate. In the implementation illustrated in FIG. 8, flow control parameters for a given data flow may be adjusted as ACKs in the flow are received. In one implementation, the one or more flow control parameters include the window size advertised to transmitting end systems in an effort to encourage a sender of packets to either slow down or speed up as appropriate. As disclosed in U.S. Pat. No. 6,038,216, flow control module 94 can replace the window size in the received ACKs with the computed advertised window size and transmit the modified ACKs to the transmitting nodes to provide a feedback mechanism that changes the rate of data transfer. Initially, device 130 of FIG. 2 receives an ACK of a sent packet is (316), and the device 130 determines if the flow corresponding to the ACK is a new flow (318). If it is a new flow, then the device 130 assigns a default window size (in one implementation, the maximum segment size (MSS)) as the advertised window size to that new flow (320). Typically, the MSS is defined by a given networking or other communications protocol.

When device 130 receives an ACK (316) in a previously detected data flow (318), then the device 130 checks to see if the flow control parameters for the flow have been changed within a threshold period of time (322). If the flow control parameters for the data flow have not changed within the threshold period of time, then the current flow parameters will continue to be utilized by the device 130 (324). If the flow control parameters have changed within the threshold period of time, then the device 130 uses a PID algorithm, as discussed below, to derive PID terms (326) that are utilized to compute one or more new flow control parameters to move the running rate of a flow towards the target rate. After the PID terms are calculated, the device 130 applies the PID terms to obtain new flow control parameters (330) and then stores the flow control parameters, sets a timestamp and finally applies the new flow control parameters/sets a new global window size (332). As discussed in one implementation, the device 130 may modify the window size advertised in the ACK that is returned to the transmitting node. It should be noted that the window size referred to in the preceding implementation is the window size for that particular flow corresponding to the transmitting node and not the global window size. In another implementation, the flow control parameters may also be a time delay value by which the device 130 may also delay transmission of the ACK to the transmitting node.

FIG. 9 is a flow chart diagram illustrating a method 334 for determining PID terms, in accordance with an exemplary embodiment. As previously indicated, there are three PID terms—a proportional (P) term, an integral (I) term and a derivative (D) term. In one implementation, the P term is kept constant, while the I and D terms are adjusted in an effort to move the running rate of a data flow to a target rate. In a preferred embodiment, the P term has a constant value of about 0.2. However, one skilled in the art will recognize that other values for P can be used and that the choice of P values is the subject of engineering considerations. First, device 130 compares the running rate (RR) of a data flow with the target rate (336). In one implementation, the target rate for the data flow is the total bandwidth allocated to the partition in which the data flow falls divided by the number of active data flows corresponding to the partition. In another implementation, the target rate for the data flow is the window size allocated to the partition for which the data flow falls divided by the number of active data flows corresponding to the partition. For example, as discussed above, if a given partition, configured with a bandwidth allocation of 1 Mbps, currently has two data flows, then the target rate for each data flow is 0.5 Mbps. If the running rate is greater that its target rate, then the device 130 will increase the D term and set the I term to zero (338) as increasing D will move the running rate back towards the target rate. Otherwise, the device 130 will then see how far the running rate is below target rate. Specifically, the device 130 determines if the running is greater than or equal to a percentage of the target rate (340). In one embodiment, the percentage is in the range of 83% to 93%. In a preferred embodiment, the percentage is 88%. If the running rate is greater than or equal to the percentage of the target rate (340), then the device will set both the I and D terms to zero (342). This is appropriate as the running rate is relatively close to the target rate and it is therefore desirable to get the running rate back to target gradually in an effort to avoid overshoot. This mode is also sometimes referred to as tangential mode.

If the running rate is less than the threshold percentage of the target rate (340), then the device 130 checks the average queuing latency for the partition against a threshold (344). If the average queuing latency is greater than a threshold (344), then the device 130 also sets both the I and D terms to zero (342). Otherwise, the device 130 will increase both the I and D terms (346) to attempt to increase the running rate of the data flow and this mode is sometimes referred to as exponential mode.

FIG. 10 is a flow chart diagram illustrating a method 348 for using PID terms to calculate an advertised window size, in accordance with an exemplary embodiment. As previously alluded to, inbound rate control can be implemented by modifying the window size advertised to transmitters and/or delaying sending ACKs. With that in mind, method 348 illustrates how the window size is adjusted for a flow in order to implement inbound rate control. It should be understood that method 348 is but one method for calculating the PID terms. Obviously, other methods can be implemented without departing from the scope of the claimed embodiments.

First, device 130 uses the three component PID terms (350) and computes a single PID term (352) from those three PID terms (P−D+I). The device 130 then calculates a delta virtual control rate by multiplying the single PID term by a difference between the current target rate and the running rate ("RR") (354). Next, the device 130 calculates a delta window size (356) by multiplying the delta virtual control rate with the round trip time observed for the flow. Finally, the device 130 determines the window size for the flow by adding the computed delta window size to the global window size of the partition divided by the total number of flows in the partition. In one implementation, the global window size for a given partition is the bandwidth allocated to the partition multiplied by the average round trip time observed for the partition.

While a number of exemplary aspects and embodiments have been discussed above, those of skill in the art will recognize certain modifications, permutations, additions and sub-combinations thereof. For example, while the embodiments have been described as operating on TCP flows, the present claimed embodiments can be applied to any suitable transport layer mechanism that includes window size as a flow control mechanism. In addition, the present invention can be applied to modify other inbound flow control parameters, such as the time delay for returning ACKs to transmitting nodes. It is therefore intended that the following appended claims and claims hereafter introduced are interpreted to include all such modifications, permutations, additions and sub-combinations as are within their true spirit and scope.

What is claimed is:

1. An apparatus operative to allocate network bandwidth to one or more partitions, the apparatus comprising:

one or more network interfaces;

a memory;

one or more processors; and an application, physically stored in the memory, comprising instructions operable to cause the one or more processors to:

monitor a running rate of a data flow between a first and a second host relative to a target rate, wherein the data flow corresponds to a partition having an aggregate bandwidth allocation and a global window size;

determine a target rate for the data flow;

compute a window size indicating a number of packets that can be transmitted before receiving an acknowledgement for the data flow, based on the target rate, the running rate and a proportional/integral/derivative-type algorithm wherein computing the window size comprises:

determining a PID term from component terms of the proportional/integral/derivative-type algorithm wherein the component terms include a proportional term, an integral term and a derivative term;

determining a delta virtual control rate by multiplying the PID term with a difference between the target rate and the running rate;

determining a delta window size by multiplying the delta virtual control rate by a round trip time for the data flow; and determining an advertised window size indicating a number of packets that can be transmitted before receiving an acknowledgement by dividing the global window size for the partition by the current number of data flows in the partition and adding the delta window size; and modify at least one acknowledgement transmitted between the first and second hosts to include the advertised window size computed in the determining step.

* * * * *